United States Patent [19]

Reinsma et al.

[11] Patent Number: 5,380,016
[45] Date of Patent: Jan. 10, 1995

[54] RADIAL LIP SEAL

[75] Inventors: Harold L. Reinsma, Dunlap; Alan M. Dickey, Peoria, both of Ill.

[73] Assignee: Caterpillar Inc., Peoria, Ill.

[21] Appl. No.: 974,635

[22] Filed: Nov. 12, 1992

[51] Int. Cl.⁶ ............................................. F16J 15/32
[52] U.S. Cl. ................................. 277/152; 277/165; 277/227
[58] Field of Search ............... 277/146, 152, 165, 198, 277/227, 138, 182, 101

[56] References Cited

U.S. PATENT DOCUMENTS

| | | | |
|---|---|---|---|
| 3,300,225 | 1/1967 | Shepler | 277/165 |
| 3,330,568 | 7/1967 | Wetzel | 277/198 |
| 3,467,448 | 9/1969 | Galle | 277/165 |
| 3,920,250 | 11/1975 | Eklund | 277/212 F |
| 4,066,269 | 1/1978 | Linne | 277/228 |
| 4,151,999 | 5/1979 | Ringel et al. | 277/165 |
| 4,244,588 | 1/1981 | Langewisch | 277/5 |
| 4,253,674 | 5/1981 | Fee | 277/5 |
| 4,269,802 | 5/1981 | Linne | 264/255 |
| 4,428,589 | 1/1984 | Reinsma | 277/101 |
| 4,469,336 | 9/1984 | Linne | 277/92 |
| 4,618,153 | 10/1986 | Nilssen | 277/152 |
| 5,269,537 | 12/1993 | Kiesel | 277/165 |

*Primary Examiner*—Daniel G. DePumpo
*Attorney, Agent, or Firm*—O. Gordon Pence

[57] ABSTRACT

A radial lip seal for sealing about a pin of a hinge joint is disclosed. Such seal includes an outer mounting ring, a rubber flex ring mounted inside the mounting ring, a tension ring mounted inside the flex ring, and an inner elastomeric seal ring mounted inside the tension ring. The seal ring has an inside diameter that is a sufficient amount smaller than the pin to cause the tension ring to be stretched by a predetermined amount when the seal is mounted about the pin. The tension ring is capable of exerting a radial force of at least 20N/cm of circumference on the seal ring upon being stretched the predetermined amount. The unique construction of such a seal is effective in sealing out highly abrasive materials found in very severe operating applications, such as on earthmoving vehicles, and provides a seal having an extremely long service life in such applications.

20 Claims, 1 Drawing Sheet

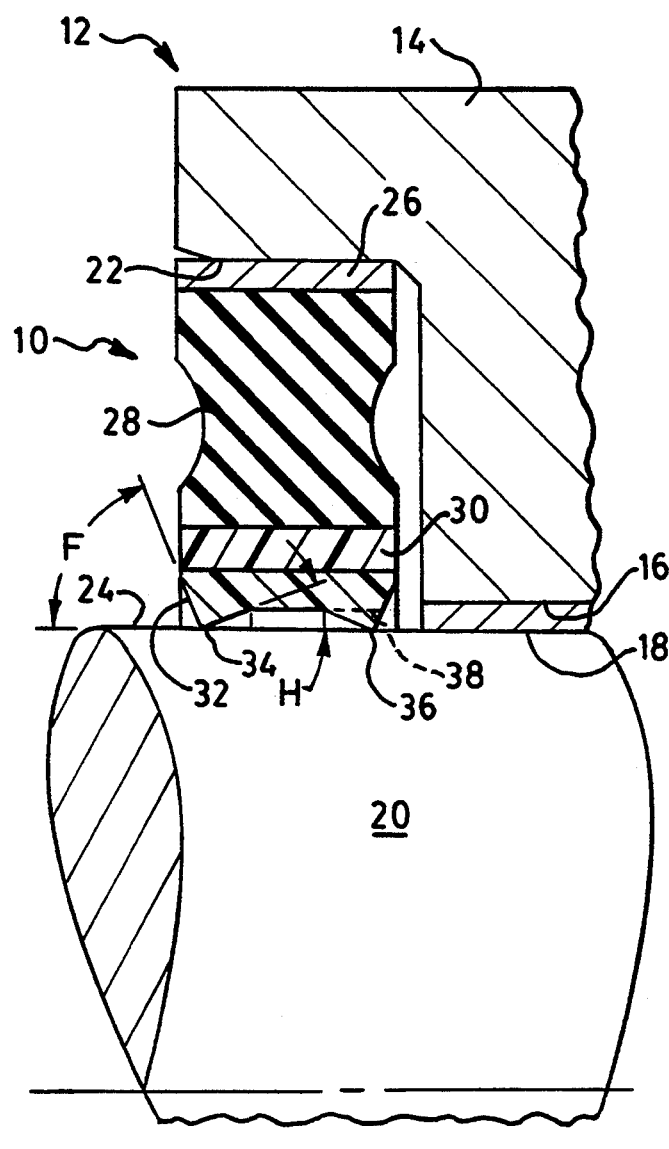
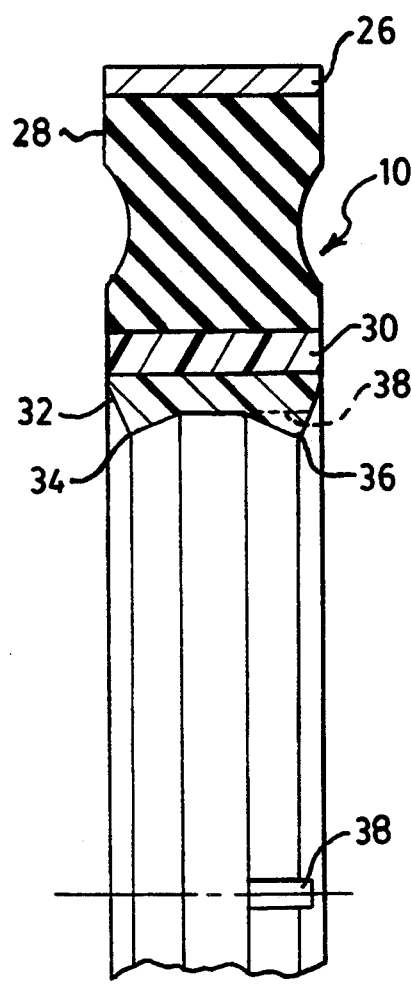

RADIAL LIP SEAL

TECHNICAL FIELD

This invention relates generally to radial lip seals for use in sealing pin joints or slow rotating shafts and the like and, more particularly, to an improved radial lip seal with an integral tension ring for applying a high stable load on a seal lip of such seal.

BACKGROUND ART

Radial lip seals are commonly used in journal boxes for sealing rotating shafts and in hinge joints for sealing oscillating pins and the like. The most common radial lip seals have a U-cup type of construction. In relatively clean environments, a little amount of inward radial load is required on the seal lip to seal in bearing lubricant. As the operating environment becomes dirtier and more severe, higher lip loads are required to ensure good sealability and to keep abrasive contaminants away from the bearings of such journal boxes or hinge joints. Garter springs have been frequently employed about such seal lips to increase the inward radial load on the lip so as to enhance its sealing ability. However, the amount of inward radial force that can be afforded by such garter spring devices is limited due to size constraints in view of the limited amount of space available for the seal and springs. Also in the typical U-cup seal, the seal lip is located at the distal end of one of the legs of the U-cup, providing an elastomeric hinge construction about which the lip moves. Such hinges do not respond rapidly at low temperatures. This low response rate can allow the seal lip to lift off of a pin that is shock loaded, for instance, so as to undergo a rapid radial deflection. Such lift off permits lubricant leakage and the entry of injurious contaminants.

Pin joints on the loader linkages of earthmoving vehicles present one of the most severe environments possible for seals. In such extremely severe applications, a very high inward radial force is desirable to prevent highly abrasive contaminants, such as mixtures of sand, dirt, and water, from not only entering the joint itself, but from becoming lodged under the seal lip, as abrasives under the lip will quickly grind a groove into the pin and/or quickly wear out the seal lip. Either of these results will lead to the entry of such contaminants into the joint and early joint failure. It has been found that the amount of radial force that can be provided by garter springs is insufficient to seal out such abrasives in the severe environments found in earthmoving applications.

The present invention is directed to overcoming the shortcomings of the prior attempts in radial lip seals at providing a sufficient amount of inward radial force on the seal lip to seal out abrasive contaminants in extremely severe applications, as well as providing better low temperature seal lip response.

DISCLOSURE OF THE INVENTION

In accordance with one aspect of the present invention, there is provided a radial lip seal for sealing a cylindrical surface. Such lip seal includes a seal ring, a tension ring and a flex ring. The seal ring is provided with an axial length sufficient to accommodate a radially inwardly projecting seal lip adjacent one end thereof and a radially inwardly projecting stabilizer lip adjacent the opposite end thereof. The tension ring is secured about the seal ring for exerting a high radial force of at least 20N/cm of circumference on the seal ring upon being stretched to a predetermined elongation factor. The flex ring is secured about the tension ring for allowing the seal ring to follow limited amounts of radial or axial displacements of the cylindrical surface.

In another aspect of the present invention, the seal ring of such a radial lip seal is made of polyurethane and the tension ring is made of polyarylsulfone, with these two materials being bonded together without the use of a bonding agent or other adhesive.

In yet another aspect, the present invention provides a method of constructing a radial lip seal that includes a rigid mounting ring, a rubber flex ring, a polyarylsulfone tension ring and a polyurethane seal ring. Such method includes the steps of: Preconstructing the mounting ring and the tension ring to suitable sizes; applying a suitable bonding agent to the outer surface of the tension ring and to the inner surface of the mounting ring; placing the tension ring and mounting ring into a first mold suitable for forming the rubber flex ring; adding rubber into the first mold between the tension ring and the mounting ring, molding and curing the rubber to create the flex ring; placing the tension ring, mounting ring and flex ring composite into a second mold suitable for forming the seal ring; injecting polyurethane into the second mold such that the polyurethane contacts the inner diameter of the tension ring under sufficient pressure to assure a pressed contact therebetween at a temperature within a range of about 50 degrees to about 200 degrees C. for a time sufficient to cause bonding between the contacting portions of the seal ring and the tension ring; and maintaining the polyurethane and polyarylsulfone at an elevated temperature for a time sufficient to post-cure the polyurethane.

BRIEF DESCRIPTION OF THE DRAWINGS

FIG. 1 is a fragmentary cross-sectional view of a hinge joint illustrating a radial lip seal embodying the principles of the present invention; and FIG. 2 is an enlarged cross-sectional view of the seal shown in FIG. 1 by itself.

BEST MODE FOR CARRYING OUT THE INVENTION

Referring more particularly to the drawings, a radial lip seal embodying the principles of the present invention is generally indicated at 10 in FIG. 1 in association with a hinge joint 12 of the type used on loader linkages of earthmoving vehicles and the like (not shown). However, the use of seal 10 is not intended to be limited solely to oscillatory applications, such as in hinge joint 12, as it is contemplated that seal 10 is equally suited for use in any slow rotary application as well, such as in a journal box for a shaft (not shown), where radial lip seals are typically used, as is well known in the art.

Hinge joint 12 includes a housing 14 having a pin bore 16 therethrough. The pin bore 16 is provided with a sleeve bearing 18 for pivotally mounting a pin 20 that extends through the housing 14 and beyond. The housing 14 also includes a counterbore 22 at one end of the bore 16 for receiving the seal 10. Pin 20 has a cylindrical bearing and sealing surface 24. Hinge joint 12 is lubricated with an oil lubricant (not shown) in a manner well known in the art.

Radial lip seal 10 is of a unitary composite construction and preferably includes a mounting ring 26, a flex ring 28, a tension ring 30, and a seal ring 32, all of which are concentrically located with respect to each other, with the mounting ring 26 being the outermost member, the flex ring 28 being next and located inside the mounting ring, the tension ring 30 being located inside the flex ring, and the seal ring 32 being the innermost member and located inside the tension ring.

The mounting ring 26 is of a cylindrical configuration and is preferably made of relatively thin steel tubing material, it being understood, however, that another metal or other rigid material could be used as well. Mounting ring 26 is provided with a final outside diameter of a size to create an interference fit with, and that requires it to be pressed into, the counterbore 22 for mounting seal 10 in the housing 14.

Flex ring 28 is made of highly resilient and easily deformable material, such a soft rubber of a Shore A durometer of from 30 to 90, and is the thickest of the components in order to accommodate substantial axial and radial movements of the pin 20 relative to the housing 14. An oil resistant synthetic rubber is preferred so as not to be degraded by the oil lubricant in the joint.

The seal ring 32 is made of a highly abrasion resistant elastomeric material. A thermoplastic polyurethane is most suitable for the seal ring 32. Seal ring 32 has an axial length sufficient to accommodate a radially inwardly projecting seal lip 34 adjacent an outboard end 35 thereof and a laterally spaced and radially inwardly projecting stabilizer lip 36 adjacent an inboard end 37 thereof. The seal ring 32 also includes passage means in the form of at least one and preferably a plurality of passages or grooves 38 through the stabilizer lip 36 for communicating oil lubricant in the hinge joint 12 with the seal lip 34 in order to lubricate the seal lip and ensure the presence of lubricant between the seal lip and the sealing surface 24 during oscillation or rotation of the pin. Seal lip 34 is preferably provided with a face angle "F" of about 70 degrees and a heal angle "H" of about 20 degrees that provides the seal lip with a stable geometry under high radial load. The stabilizer lip 36 is preferably provided with similar face and heal angles for the same reason and to provide the seal and stabilizer lip with similar wear and set characteristics as the seal lip.

The tension ring 30 is of a thin cylindrical construction and must be made of a high tensile strength material to produce a high hoop tension when stretched, while exhibiting excellent tensile creep resistance so as not to lose hoop tension over time. In particular, the tension ring material should have a tensile modulus of between 300 and 14,000 MPa, with a tensile modulus of about 3000 MPa being preferred, and have an ultimate elongation factor of at least 5%. Such a material should also provide less than 50% creep in 10,000 hours after being stretched to an elongation factor of 4%. As used herein, creep means a loss over time in the initial hoop tension that the tension ring has after being stretched to an elongation factor lower than its ultimate elongation. The material must also be capable of being suitably bonded to the rubber flex ring 28 and to the seal ring 32. A polyarylsulfone has been found to be the most suitable material for the tension ring 30 as it has been found to develop a strong bond to polyurethane without the use of an adhesive. Polyarylsulfone is commercially available from a several companies. In particular, a polyarylsulfone from Amoco Performance Products, Inc. in Atlanta, Ga. and sold under the tradename Radel A100, has been used with satisfactory results.

The seal 10 is constructed in the following manner. First, the mounting ring 26 and the tension ring 30 are separately pre-constructed to suitable sizes. The steel mounting ring 26 may be made in any conventional manner. Preferably, the mounting ring is initially constructed to a diameter size that is about 15% larger than its final diameter for a purpose hereinafter explained. The tension ring 30 is made by a suitable molding process and formed to a diameter size that is about 2% smaller than its final size when mounted on the pin 20. Next, the rubber of the flex ring 28 is then molded between the tension ring 30 and the mounting ring 26 through the use of a first mold suitable for forming the desired shape of the flex ring and by using conventional rubber molding and curing processes. Before molding, a suitable bonding agent is preferably applied to the outer surface of the tension ring 30 and the inner surface of the mounting ring 26 to secure the flex ring to the tension ring 30 and to the mounting ring 26.

After this is accomplished, the seal ring 32 is constructed and, at the same time, affixed to the tension ring 30. This is accomplished in the molding process for constructing the seal ring. In such molding process, the tension ring 30, flex ring 28 and mounting ring 26 composite previously formed are placed into a second mold suitable for forming the desired shape of the seal ring. Next, polyurethane is injected into the mold such that the polyurethane contacts the inner diameter of the tension ring 30 under sufficient pressure to assure a pressed contact therebetween. Generally, the pressure of contact will fall within a range of from 17 MPa to about 54 MPa, with about 28 MPa being preferred. The contacting is generally at a temperature within a range of from about 50 degrees to about 200 degrees C. The contacting is continued at the above temperature and under the above pressed contact conditions for a time sufficient to cause bonding between the contacting surface portions of the seal ring 32 and the tension ring 30. Generally, the contacting time falls within a range of from 0.5 seconds to about 20 seconds. In order to fully complete the bonding of the polyurethane to the polyarylsulfone, they are maintained at an elevated temperature within a range of from 90 degrees to 125 degrees C. for a time sufficient to post-cure the polyurethane and thereby strengthen the bond therebetween. Preferably, the post-curing time will fall within a range of from 16 to 24 hours. By utilizing the above process, it has been unexpectedly found that a direct bonding of the tension ring 30 to the seal ring 32 can be obtained without the use of an adhesive or other bonding agent therebetween, whereby a bond is formed which is strong enough to withstand the stress to which such a seal is exposed.

Once the seal 10 is constructed, as described above, the size of the mounting ring 26 is reduced by a suitable swaging operation to its finished diameter. Preferably, the swaging is effective in reducing the radial height of the flex ring 28 by about 15%. The purpose of this swaging operation is to place the rubber in radial compression so as to prevent it from going into tension during use in order to enhance the service life of the rubber flex ring.

As constructed, the seal lip 34 and the stabilizer lip 36 of the seal ring 32 are each provided with an inside diameter that is a predetermined amount smaller than the outer diameter of the pin 20. As a consequence, the tension ring 30 must be stretched a predetermined amount in order for the seal 10 to be mounted on the pin 20. This stretching creates hoop tension in the tension ring 30 that exerts a radial force of at least 20N/cm of circumference on the seal ring 32. Such tension ring is generally capable of exerting a radial force of between 50 and 250N/cm of circumference at an elongation factor within a range of from about 0.5% to about 2.5% of the tension ring, with a range of from about 1% to about 2% being preferred. By way of example, an approximately 55 mm diameter polyarylsulfone tension ring made from Radel A100 and having an axial width of about 10 mm and a radial thickness of 2.25 mm provided a substantial nominal radial force of about 250N/cm of circumferential at a 1.5% elongation level. Radel A100 has an ultimate elongation of 6.5%. If has been found that by maintaining elongation at a level of 2% or less, a minimal amount of creep occurs. Accordingly, a substantially constant force that is provided by the hoop tension is maintained on the seal lip 34 throughout the entire service life of the seal 10.

INDUSTRIAL APPLICABILITY

The radial lip seal 10 constructed in accordance with the teachings of the present invention advantageously provides a radial lip seal 10 with a much higher lip force than conventional seals to enable the seal lip to block the entry of injurious and highly abrasive materials into the hinge joint 12 or even the entry of such material under the seal lip itself. The construction also enables the lip load to be generally unaffected by axial or radial movements of the pin 20 relative to the housing 14. This is because such axial and radial movements are accommodated solely through flexure of the flex ring 28, which is compounded to easily perform such duties. No lip or tension ring flexure is required for such movements of the pin. This is aided by the fact that the seal 10 grips the pin more tightly than any prior art lip seal, which further resists axial or radial movement of the seal lip 34 on the pin 20. This enables the seal 10 to accommodate significant axial displacements of the pin relative to the housing solely in the flex ring 28, without any accompanying axial movement of the seal lip 34 on the pin 20. Thus, the seal lip 34 is not being wiped over exposed portions of the pin's sealing surface 24 that are likely to bear grit and other highly abrasive materials, as is common with prior lip seals.

As noted earlier, the seal lips of the prior art lip seals are located at the end of a cantilevered arm. This causes the lip to move in an arc during radial movements of the pin. This arcuate movement of the seal lip changes the orientation of the lip relative to the pin. Under high load, the lip may heal over to the inside or fold out to the outside, which eliminates the desired sealing contact with the pin surface 24. Such arcuate movement of the seal lip 34 is eliminated in the present seal construction, which maintains proper lip orientation of the seal lip 34 to the sealing surface 24. The healing over or folding out the seal lip is further resisted in the present seal 10 by providing the seal lip 34 and the stabilizer lip 36 with desired face and heal angles. In particular, each lip has a face angle of generally 70 degrees and an heal angle of generally 20 degrees to the cylindrical pin sealing surface 24. The tension ring 30 also provides the seal ring 32 with a stable base for maintaining the seal lip 34 and stabilizer lip 36 in proper orientation with respect to the cylindrical surface 24, regardless of pin deflections.

As a result of the construction of the present radial lip seal 10, such a seal 10 is capable of long service life in the most severe operating conditions with continuous exposure to highly abrasive mixtures of sand, dirt and water, such as found in the earthworking applications of earthmoving vehicles.

Other aspects, objects and advantages of the present invention can be obtained from a study of the drawings, the disclosure and the appended claims.

We claim:

1. A high load radial lip seal for sealing a cylindrical surface, comprising:
    a seal ring having an elongated axial length with opposite ends, a radially inwardly projecting seal lip adjacent one end thereof and a radially inwardly projecting stabilizer lip adjacent the opposite end thereof;
    a tension ring secured about said seal ring, said tension ring being constructed of a material of sufficient tensile modulus to exert a high radial force of at least 20N/cm of circumference along the length of said seal ring upon being stretched to a predetermined elongation factor within a range of from about 0.5% to about 2.5%; and
    a flex ring secured about said tension ring, said flex ring being constructed of a highly resilient, easily deformable material to allow said seal ring to follow limited amounts of radial and axial displacements of the cylindrical surface.

2. The seal of claim 1 wherein said tension ring exerts a radial force on said seal ring of between 50 and 250N/cm of circumference at said elongation factor within a range of from about 0.5% to about 2.5% of said tension ring.

3. The seal of claim 2 wherein said seal and stabilizer lips each have an inner diameter of a size sufficient to cause the tension ring to be stretched to said elongation factor when the seal is mounted about said cylindrical surface.

4. The seal of claim 1, wherein said tension ring material is polyarylsulfone.

5. The seal of claim 4, wherein said predetermined amount of stretch is equivalent to about 2% elongation of the polyarylsulfone.

6. The seal of claim 5, wherein said seal ring is of a polyurethane material.

7. The seal of claim 6 further comprising a mounting ring secured about said flex ring, said mounting ring being reduced in diameter by an amount sufficient to maintain said flex ring in compression.

8. The seal of claim 7 wherein said seal includes passage means for communicating lubricant to said seal lip.

9. The seal of claim 8, wherein said seal ring is bonded to said tension ring free of any bonding agent.

10. A high force radial lip seal for sealing a hinge joint, said hinge joint including a pin having a cylindrical surface and a counterbore about said pin for receiving said radial lip seal, said seal comprising:
    a radially outer mounting ring for mounting said seal within said counterbore;
    a radially inner seal ring for sealing about said cylindrical pin surface, said seal ring being of a thermoplastic elastomeric material;
    a rubber flex ring for accommodating axial and radial motions of said pin relative to said hinge joint, said flex ring being disposed inside of and secured to said mounting ring; and
    a tension ring disposed between and secured to said flex ring and said seal ring, said tension ring being constructed of material of sufficient tensile modulus to exert a high radial force of at least 20N/cm of circumference along the length of said seal ring upon being stretched to a predetermined elongation factor within a range of from about 0.5% to about 2.5%.

11. The seal of claim 10 wherein:
said seal ring has an inside diameter that is a sufficient amount smaller than said cylindrical surface to cause said tension ring to be stretched to said predetermined elongation factor when said seal is mounted about said cylindrical surface.

12. The seal of claim 11, wherein the material of said tension ring has a tensile modulus of between 300 and 14,000 MPa and an ultimate elongation of at least 5% and will experience less than 50% creep over a time period of 10,000 hours after being stretched to an elongation factor of 4%.

13. The seal of claim 12, wherein said material of the tension ring has a tensile modulus of about 3000 MPa and an ultimate elongation of about 6.5% and is capable of producing an initial hoop tension that is greater than 150N/cm of circumference at a 2% elongation factor.

14. The seal of claim 11, wherein said tension ring material is polyarylsulfone.

15. The seal of claim 14, wherein said predetermined amount of stretch is equivalent to about 2% elongation of the polyarylsulfone.

16. The seal of claim 15, wherein said seal ring is of a polyurethane material.

17. The seal of claim 16, wherein said mounting ring is steel and is reduced in diameter by swaging in an amount sufficient to maintain said rubber flex ring in compression.

18. The seal of claim 17, wherein said seal ring has an elongated axial length with a radially inwardly projecting seal lip adjacent one end thereof and a laterally spaced and radially inwardly projecting stabilizer lip adjacent the opposite end thereof, and passage means for communicating lubricant past said stabilizer lip to said seal lip.

19. The seal of claim 18, wherein said seal lip and said stabilizer lip are oriented to engage said cylindrical surface and each have a face angle of about 70 degrees relative to said surface and a heal angle of about 20 degrees relative to said cylindrical surface.

20. The seal of claim 19, wherein said seal ring is bonded to said tension ring free of any bonding agent.

* * * * *